United States Patent

Fennel et al.

Patent Number: 5,477,456
Date of Patent: Dec. 19, 1995

[54] PROCESS AND CIRCUIT ARRANGEMENT FOR THE REDUCTION OF DISADVANTAGEOUS EFFECTS OF ENGINE STALL TORQUES

[75] Inventors: Helmut Fennel, Bad Soden; Jean-Claude Schwartz, Frankfurt am Main; Otto Determann, Darmstadt; Robert Schmidt, Rennerod; Norbert Ehmer, Bad Orb, all of Germany

[73] Assignee: ITT Automotive Europe GmbH, Frankfurt am Main, Germany

[21] Appl. No.: 211,535

[22] PCT Filed: Aug. 11, 1993

[86] PCT No.: PCT/EP93/02126

§ 371 Date: Jun. 27, 1994

§ 102(e) Date: Jun. 27, 1994

[87] PCT Pub. No.: WO94/04400

PCT Pub. Date: Mar. 3, 1994

[30] Foreign Application Priority Data

Aug. 14, 1992 [DE] Germany ............... 42 26 940.7

[51] Int. Cl.$^6$ ........................................... B60T 8/58
[52] U.S. Cl. .................. 364/426.02; 364/426.03; 303/141; 180/197
[58] Field of Search ............... 364/426.01, 426.02, 364/426.03; 188/197; 303/93, 95, 96, 97, 100, 102, 103, 105, 110, 111

[56] References Cited

U.S. PATENT DOCUMENTS

| | | | |
|---|---|---|---|
| 4,765,430 | 8/1988 | Schulze et al. | 180/197 |
| 4,825,989 | 5/1989 | Frigger | 142/13 R |
| 4,991,097 | 2/1991 | Fodale et al. | 364/424.1 |
| 4,998,593 | 3/1991 | Karnopp et al. | 180/140 |
| 5,058,699 | 10/1991 | Fennel et al. | 180/197 |
| 5,221,127 | 6/1993 | Ehmer et al. | 303/92 |
| 5,272,636 | 12/1993 | Buschmann et al. | 364/426.02 |
| 5,277,482 | 1/1994 | Beyer et al. | 303/92 |
| 5,322,356 | 6/1994 | Kolbe et al. | 303/111 |
| 5,341,297 | 8/1994 | Zomotor et al. | 364/426.03 |

FOREIGN PATENT DOCUMENTS

| | | |
|---|---|---|
| 3236534 | 4/1984 | Germany. |
| 3615639 | 11/1987 | Germany. |
| 3737697 | 5/1989 | Germany. |
| 3808692 | 10/1989 | Germany. |
| 3942862 | 6/1991 | Germany. |
| 4009355 | 9/1991 | Germany. |
| 4017891 | 9/1991 | Germany. |
| 4040256 | 7/1992 | Germany. |

*Primary Examiner*—Kevin J. Teska
*Assistant Examiner*—Susan Wieland
*Attorney, Agent, or Firm*—Ratner & Prestia

[57] ABSTRACT

For the reduction of disadvantageous effects of engine stall torques on the braking behavior of a vehicle which is equipped with a brake unit having an anti-lock control system, the brake slip of the driven wheels is monitored independently of any actuation of the brake. In the event of a rotational behavior of the driven wheels which is typical of the effect of engine stall torques, in particular in the event of a brake slip at the driven wheels exceeding a limit value, brake pressure existing in the wheel brakes of the driven wheels is maintained constant or reduced, or, if the braking action has not yet commenced, the supply of brake pressure into the wheel brakes of the driven wheels is prevented.

14 Claims, 2 Drawing Sheets

PROCESS AND CIRCUIT ARRANGEMENT FOR THE REDUCTION OF DISADVANTAGEOUS EFFECTS OF ENGINE STALL TORQUES

BACKGROUND OF THE INVENTION

The present invention relates to a process for the reduction of disadvantageous effects of engine stall torques on the braking behavior of a vehicle which is equipped with a brake unit having an anti-lock control system. A circuit arrangement for carrying out the process, also, is part of the invention.

In the event of low coefficients of friction, the engine stall torque, which is transmitted from the driving engine through the gearing to the driven wheels, can very rapidly lead to a brake torque which is excessive relative to the running stability of the driven wheels. This holds true, in particular, of high-power driving engines and when a low gear has been applied. As a result of this brake torque caused by the driving engine, the steerability is greatly reduced for a vehicle with front-wheel drive. In case of rear-wheel drive, there is even the risk of skidding. This phenomenon starts immediately upon the reduction of the driving power and may even be boosted by the operation of the brakes.

From published German patent application No. DE 4040256 Al, a circuit arrangement for a brake unit with anti-lock control system is known which triggers a test cycle if and when, during a control cycle, the two wheels of a driven axle signal instability beyond a preset lag of time. Due to the test cycle, brake pressure is controlledly supplied into the wheel brake of the slower wheel, and the reaction of the driven wheels to the controlled supply of pressure is evaluated. In this manner, the control system determines whether or not the matter involves effects of an engine stall torque. If this is the case, then, due to the controlled supply of pressure into the wheel brake of the slower wheel, the speed of the second wheel of this axle is increased through the differential and, as a result, the running stability and the lateral control are remarkably improved.

It is, moreover, prior art to prevent the transmission of the engine stall torque to the wheels by interfering with the driving line, that is to say by disengaging the clutch. This is complicated, especially because the correct moment for clutching again is difficult to determine.

Another possible solution to the problem involves reducing the brake torque which is transmitted to the driven wheels by increasing the engine speed with the aid of a stall torque control system.

SUMMARY OF THE INVENTION

It is, therefore, an object of the present invention to develop a process of the type identified above which, without any interference with the drive of the vehicle, decisively reduces, in a simple way, the disadvantageous effects engine stall torques have on the braking behavior of a vehicle.

The present invention is based on the recognition that, at a very early moment, generally before any operation of the brake, engine stall torques have disadvantageous effects. Such a situation may come about as soon as the driver takes his foot off the accelerator pedal, and, for that matter, independently of any subsequent brake operation. The controlled supply of brake pressure into the wheel brakes of the driven wheels is then prevented as a result of the recognition of engine stall torques. The reapproach of the vehicle speed to the speed of the driven wheels is not hampered because there is no additional supply of brake pressure. It will be appreciated that the driven wheels are very rapidly conditioned to again provide elevated lateral guiding forces. With front-wheel drive, the steerability is preserved or restored again very quickly.

According to one advantageous embodiment of the present invention, a nearly equal brake slip at the driven wheels, exceeding a preset limit value or falling within a pre-established band, is taken as an indicator of the effect of engine stall torques. The supply of brake pressure is then prevented or brake pressure already existing is reduced until the vehicle speed again approximately coincides with the speed of the driven wheels.

Further features, advantages and possibilities of application of the present invention will become apparent from the following description of further details, making reference to the accompanying drawings.

DETAILED DESCRIPTION OF THE INVENTION

Figure 1:
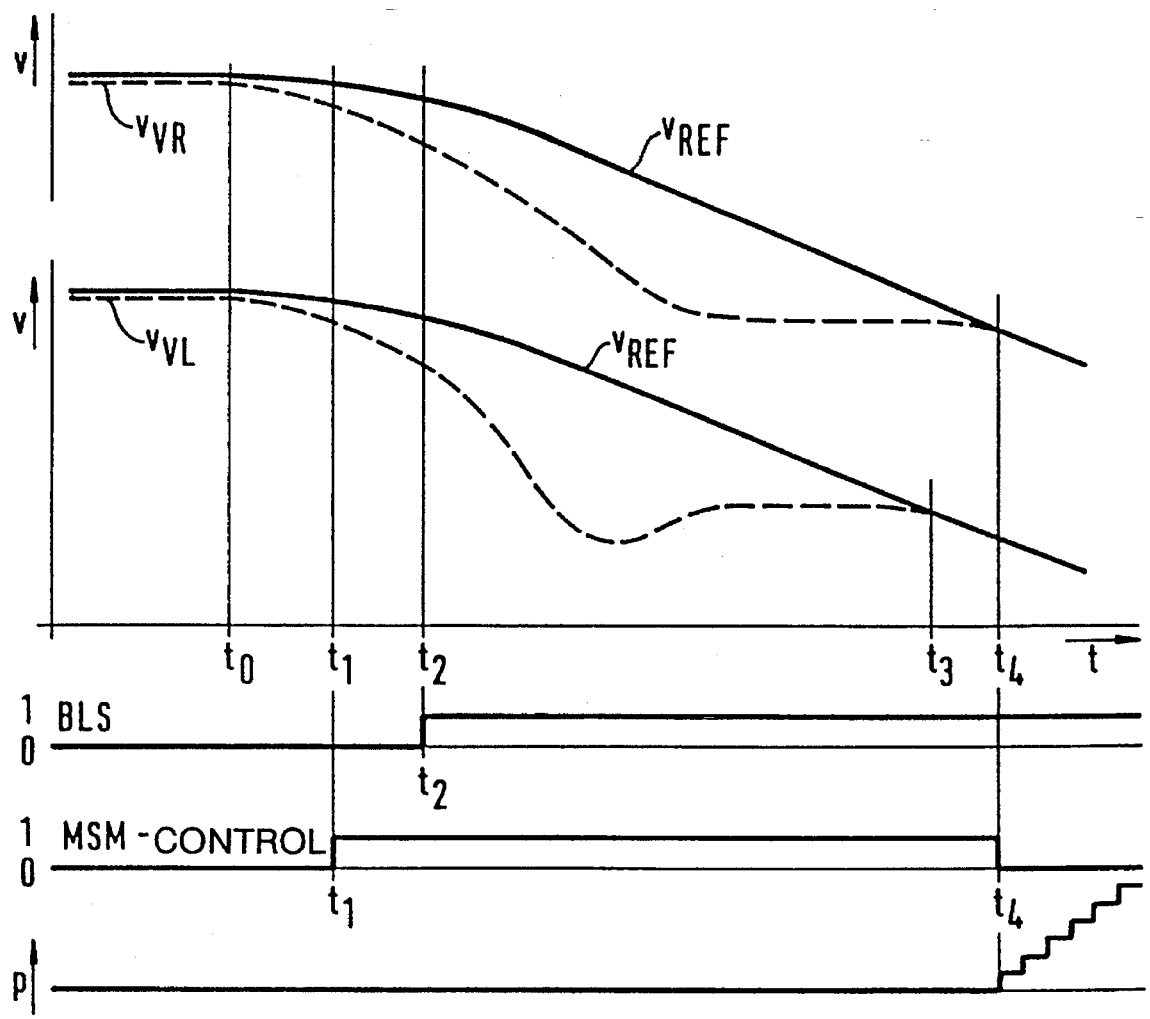
FIG. 1 shows in the shape of graphs the course of the wheel speed and of the vehicle reference speed in a typical phase of operation of the present invention and FIG. 2 shows in a simplified, diagrammatic representation the most important components of a circuit arrangement according to the present invention.

The graphs in FIG. 1 hold true of a vehicle with front-wheel drive, and they refer to a situation in which the inventive process becomes effective. The course of the speed $v_{VR}$, $v_{VL}$ of the right front wheel (VR) and of the left front wheel (VL) of a vehicle and the vehicle speed or vehicle reference speed $v_{REF}$ during the same period of time are shown. The graphs represent a driving situation on a low coefficient of friction, for example on sleet or snow.

Initially, the speed of the vehicle is nearly constant, with the result that the wheel speed $v_{VR}$, $v_{VL}$ and the vehicle reference speed $v_{REF}$ coincide. At the moment $t_0$, the driver takes his foot off the accelerator pedal, so that now the vehicle is braked as a result of the engine stall torque which is transmitted to the driven front wheels and which becomes effective there as a brake torque. In this situation, the braking effect at the front wheels is so high that a uniform, strong brake slip comes about at both front wheels. The difference between the wheel speed $v_{VR}$, $v_{VL}$, respectively, and the reference speed $v_{REF}$ corresponds to the slip.

At the moment $t_1$, the brake slip at the two front wheels exceeds a pre-established response threshold, whereupon the inventive engine stall torque control (MSM control) starts. The control prevents the supply of any pressure whatsoever into the wheel brakes of the driven wheels. If brake pressure should already exist in these wheel brakes, which is not the case in this instance, then this pressure will be maintained constant or even be reduced.

The course of braking action at the non-driven rear wheels is not influenced by the MSM control.

At the moment $t_2$, the vehicle brake is operated. This is illustrated by the generation of the BLS signal (BLS= stoplight switch). In addition to the engine stall torque, which has a braking effect and which acts on the driven wheels, brake power will now also be exerted on the non-driven wheels, so that the deceleration of the vehicle will increase. The vehicle speed decreases. The differences now to be noticed in the course of the speed of the two front wheels, respectively in the brake slip at the front wheels, are due to unequal coefficients of friction, unequal wheel loads, etc. It will furthermore be necessary to take into account that the two front wheels are coupled to each other through the differential driving gear.

In the further course of what happens, an approach of the vehicle speed and, thus, of the vehicle reference speed, to the run of the two front wheels takes place. At the moment $t_3$ the brake slip at the left front wheel VL, and at the moment $t_4$ at the right front wheel VR, will become nearly zero. As a result, the MSM control is ended, with the result that brake pressure p will now be supplied to the driven front wheels. The stepped course of the pressure characteristic p indicates that, in the embodiment under consideration, the brake pressure is controlled by a sequence of impulses.

It can be seen from the graphs that, as a result of the early reaction of the brake unit on the instability being due to the engine stall torque, respectively on the excessive brake slip, and as a result of the early start of the MSM control (already before the operation of the brake), the running stability of the front wheels and, thus, the steerability of the vehicle is preserved or is very rapidly restored again. In the case of vehicles with rear wheel drive, the MSM control according to the present invention has a favorable effect on the driving stability of the vehicle.

Figure 2:
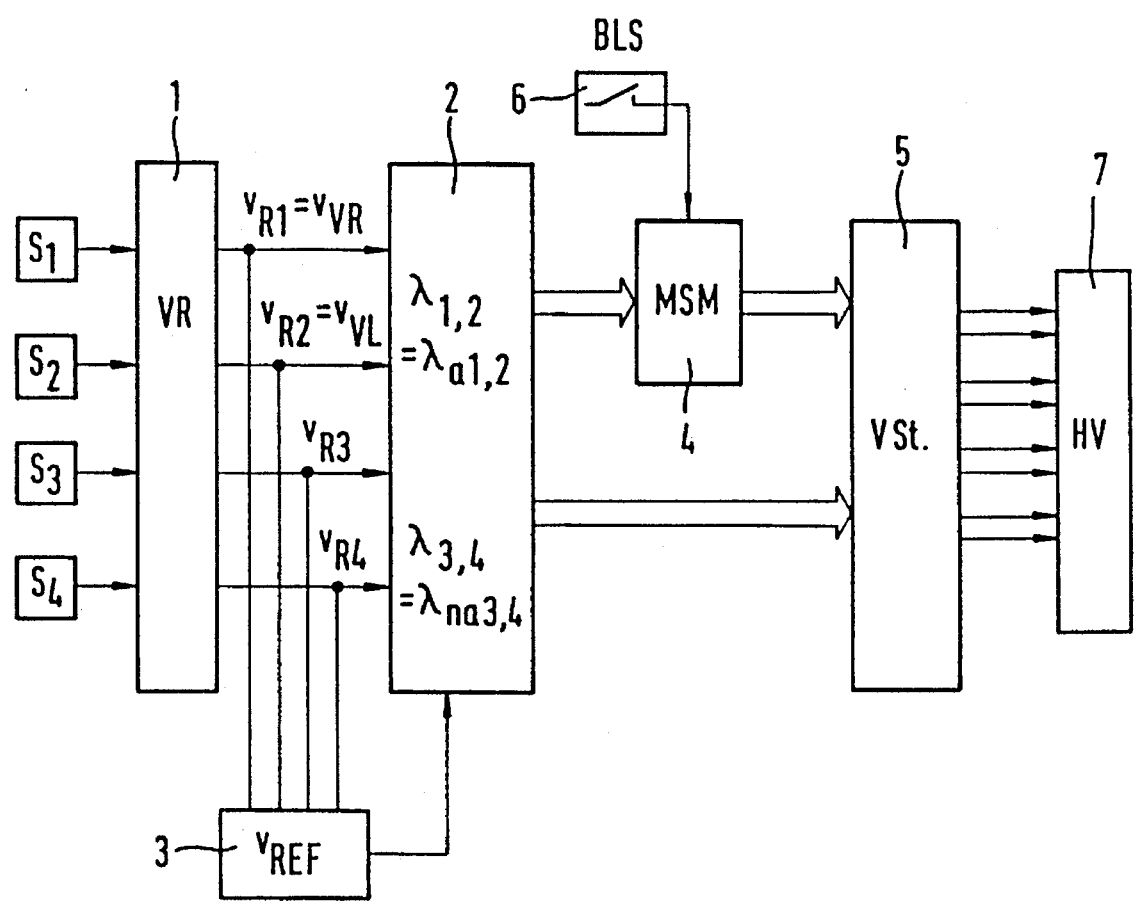

FIG. 2 illustrates a circuit arrangement for carrying out the inventive process.

The vehicle wheels are furnished individually from wheel sensors $S_1$ to $S_4$. Upon the processing of the sensor signals in a processing circuit 1, the signals $v_{R1}$ to $v_{R4}$, which reflect the rotational behavior of the individual wheels, are processed further in a circuit 2. In addition, a vehicle reference speed $v_{REF}$ is formed by logical linkage of the speed signals $v_{R1}$ to $v_{R4}$ in a circuit 3.

In the circuit 2, the specific wheel slip $\lambda_{1\ldots4}$ is derived from the wheel speeds $v_{R1}$ to $v_{R4}$ and from the vehicle reference speed $v_{REF}$, the distinction being made in circuit 2 between the slip of the driven wheels (index "a") and the slip of the non-driven wheels (index "na"). In correspondence with FIG. 1, the two front wheels are driven in the example under consideration, so that $v_{R1}$ is equated to $v_{VR}$ and $v_{R2}$ is equated to $v_{VL}$.

Through a switch block 4 in which the engine stall torque control (MSM) takes place, the slip values $\lambda_{a1}$, $\lambda_{a2}$ of the driven wheels, that is to say, of the front wheels in this instance, are transmitted to a switch block 5 which contains the valve control VSt. The slip values derived from the rotational behavior of the non-driven rear wheels ($v_{R3}$, $v_{R4}$) are conveyed directly to the valve control 5.

As is symbolized by the switch block 6 with the stoplight switch BLS, the engine stall torque control 4 is fed, in addition, information on the moment of the actuation of the brake.

Finally, with the output signals of the valve control 5, the electrically actuatable hydraulic valves HV are controlled which are grouped together in a block 7.

It will, therefore, be appreciated from FIG. 2 that the present invention can be implemented by a simple supplementary circuit, namely by the engine stall torque control 4.

We claim:

1. A process for the reduction of disadvantageous effects of engine stall torques on the braking behavior of a vehicle which is equipped with a brake unit furnished with an anti-lock control system, wherein, independently of any actuation of the brake, the brake slip of the driven wheels is monitored and, in the event of a rotational behavior of the driven wheels being typical of the effect of engine stall torques, a pressure build-up in the wheel brakes of the driven wheels is prevented or existing brake pressure is reduced.

2. A process as claimed in claim 1, wherein a nearly equal brake slip at the driven wheels exceeding a preset limit value indicates engine stall torques.

3. A process as claimed in claim 2, wherein the brake pressure build-up is prevented or the brake pressure reduction continued until the vehicle reference speed has approached the speed of the driven wheels.

4. A circuit arrangement for the realization of the process as claimed in claim 1, for a brake unit furnished with: (a) an anti-lock control system, (b) wheel sensors for developing sensor signals representative of the wheel rotation behavior of the wheels of the vehicle, and (c) circuits for: (1) evaluating the sensor signals, (2) monitoring wheel slip, vehicle reference speed and other regulating variables, and (3) generating brake pressure control signals, including circuits which monitor the brake slip of the driven wheels independently of any brake actuation and which, in the event of a nearly equal brake slip at the driven wheels exceeding a preset limit value or falling within a pre-established range, prevent the supply of brake pressure into the wheel brakes of the driven wheels until the vehicle reference speed has at least approximately reached the speed of the driven wheels.

5. A circuit arrangement as claimed in claim 4, wherein, in the event of a nearly equal brake slip at the driven wheels exceeding a preset limit value or falling within a pre-established range, said circuits maintain constant or reduce existing brake pressure until the vehicle reference speed has at least approximately reached the speed of the driven wheels.

6. Apparatus for reducing the effects of engine stall torques on the braking behavior of driven wheels of a vehicle also having non-driven wheels, said apparatus comprising:

first means for developing brake slip signals representative of brake slip of the driven wheels of the vehicle;

second means responsive to said brake slip signals for:
(a) monitoring said brake slip signals independent of brake actuation, and
(b) developing a control signal when said brake slip signals exceed a pre-established level;

and third means responsive to said control signal for preventing application of brake pressure to wheel brakes associated with the driven wheels of the vehicle until the brake slips of the driven wheels of the vehicle are substantially zero.

7. Apparatus according to claim 6 wherein said first means include:
(a) means for developing wheel rotation signals representative of the wheel rotation behavior of the wheels of the vehicle,
(b) means responsive to said wheel rotation signals for developing a vehicle reference speed signal representative of the speed of the vehicle, and
(c) means responsive to said wheel rotation signals and said vehicle reference speed signal for developing said brake slip signals.

8. Apparatus according to claim 6 wherein said first means also develops brake slip signals representative of brake slip of the non-driven wheels of the vehicle.

9. Apparatus according to claim 8 wherein said third means include:

(a) a switch block, and (b) hydraulic valves associated with the wheel brakes of the vehicle which regulate brake pressure applied to the wheel brakes of the vehicle and are controlled by said switch block.

10. Apparatus according to claim 9 wherein said brake slip signals representative of the brake slip of the non-driven wheels are conducted directly from said first means to said switch block.

11. A process for reducing the effects of engine stall torques on the braking behavior of driven wheels of a vehicle also having non-driven wheels, said method comprising the steps of:

determining the brake slip of the driven wheels of the vehicle;

monitoring the brake slip of the driven wheels of the vehicle independent of brake actuation;

determining when the brake slip of the driven wheels of the vehicle exceeds a pre-established level;

and preventing application of brake pressure to wheel brakes associated with the driven wheels of the vehicle until the brake slips of the driven wheels of the vehicle are substantially zero.

12. A process according to claim 11 wherein said step for determining said brake slip of the driven wheels of the vehicle includes:

(a) determining the wheel rotation behavior of the wheels of the vehicle, (b) determining the speed of the vehicle, and (c) determining said brake slip from said wheel rotation behavior determination and said vehicle speed determination.

13. A process according to claim 11 further including the step of determining the brake slip of the non-driven wheels of the vehicle.

14. A process according to claim 13 further including the step of regulating brake pressure applied to wheel brakes associated with the non-driven wheels of the vehicle regardless of the brake slip of the driven wheels.

* * * * *